United States Patent
Wang

(10) Patent No.: US 11,486,060 B2
(45) Date of Patent: Nov. 1, 2022

(54) CARBON FIBER RECYCLING METHOD

(71) Applicant: UHT UNITECH COMPANY LTD., Taoyuan (TW)

(72) Inventor: Chih-Yung Wang, Taoyuan (TW)

(73) Assignee: UHT UNITECH COMPANY LTD., Taoyuan (TW)

( * ) Notice: Subject to any disclaimer, the term of this patent is extended or adjusted under 35 U.S.C. 154(b) by 115 days.

(21) Appl. No.: 17/207,938

(22) Filed: Mar. 22, 2021

(65) Prior Publication Data

US 2021/0214862 A1 Jul. 15, 2021

Related U.S. Application Data

(63) Continuation-in-part of application No. 15/893,822, filed on Feb. 12, 2018, now abandoned.

(30) Foreign Application Priority Data

Jan. 12, 2018 (TW) ................................ 107101347

(51) Int. Cl.
*D01G 11/00* (2006.01)
*H05B 6/80* (2006.01)
(Continued)

(52) U.S. Cl.
CPC ............ *D01G 11/00* (2013.01); *B29B 17/021* (2013.01); *H05B 6/6402* (2013.01); *H05B 6/707* (2013.01); *H05B 6/80* (2013.01); *D10B 2101/12* (2013.01)

(58) Field of Classification Search
CPC .................. D01G 11/00; B29B 17/021; B29B 2017/0496; B29B 17/04; H05B 6/6402;
(Continued)

(56) References Cited

U.S. PATENT DOCUMENTS

2002/0017162 A1* 2/2002 Dannenhauer ........... C08J 11/08
75/10.13
2011/0057341 A1* 3/2011 Meier ..................... B29B 17/02
264/37.28
(Continued)

FOREIGN PATENT DOCUMENTS

CN 2582329 Y 10/2003
DE 19738882 C1 10/1998
DE 102007026748 A1 6/2008

OTHER PUBLICATIONS

Jiang, et al., Recycling carbon fiber composites using microwave irradiation: Reinforcement study of the recycled fiber in new composites, J. Appl. Polym. Sci. 2015; 42658: pp. 1-9 (Year: 2015).*

(Continued)

*Primary Examiner* — Daniel C. McCracken
(74) *Attorney, Agent, or Firm* — Demian K. Jackson; Jackson IPG PLLC

(57) ABSTRACT

A carbon fiber recycling method utilizes a carbon fiber recycling device for recycling carbon fiber from a carbon fiber polymer composite by using a microwave. The carbon fiber recycling device has a cavity and at least one microwave supplying unit. The carbon fiber recycling method adjusts the microwave supplying unit to change the angle between the long axis direction of the cavity and the electric field direction, and to make the long axis direction of the carbon fiber parallel to the electric field direction. By radiating the microwave on the carbon fiber polymer composite, energy of the microwave is quickly absorbed by the carbon fiber to quickly increase a temperature of the carbon fiber, and the carbon fiber polymer composite is effectively and quickly decomposed to remove most polymer matrix of the carbon fiber polymer composite, so as to achieve the objective of recycling the carbon fiber indeed.

17 Claims, 12 Drawing Sheets

(51) Int. Cl.
*H05B 6/64* (2006.01)
*H05B 6/70* (2006.01)
*B29B 17/02* (2006.01)

(58) Field of Classification Search
CPC .......... H05B 6/707; H05B 6/80; H05B 6/806; H05B 6/701; D10B 2101/12; B29K 2105/101; B29K 2307/04; Y02W 30/62
See application file for complete search history.

(56) References Cited

U.S. PATENT DOCUMENTS

2013/0118691 A1* 5/2013 George ................... B29B 17/02
156/704
2014/0194645 A1* 7/2014 Anderson ........... B29B 17/0206
442/175

OTHER PUBLICATIONS

Obunai, et al., Carbon fiber extraction from waste CFRP by microwave irradiation, Composites: Part A 2015; 78: 160-165 (Year: 2015).*

1st office action for corresponding CN Application No. 201810045586.1, dated Mar. 26, 2021.

* cited by examiner

CARBON FIBER RECYCLING METHOD

CROSS REFERENCE

The present invention is Continuation-In-Part of U.S. patent application Ser. No. 15/893,822 filed on Feb. 12, 2018, and claims priority of TW Patent Application 107101347 filed on Jan. 12, 2018, wherein all contents of the references which priorities are claimed by the present invention are included in the present invention, herein.

BACKGROUND

1. Technical Field

The present disclosure relates to a carbon fiber recycling method, in particular, to a carbon fiber recycling method which utilizes a microwave to recycle a carbon fiber from a carbon fiber polymer composite.

2. Description of Related Art

According to the current technology, the carbon fiber polymer composites (such as, Carbon Fiber Reinforced Polymer/Plastic, CFRP) are widely used in the industrial fields of aerospace aircrafts, golf clubs, tennis racquets, cars, wind powers, and medical devices since the carbon fiber polymer composite have properties of the high strength, the high elastic modulus, the nice heat resistance and the nice corrosion resistance. The produced scrap at the manufacturing stage or the carbon fiber polymer composite waste material of the scrap product with the ended usage lifetime may have the processing problem, wherein the manner for burning the carbon fiber polymer composite can merely burn the resin away, and the carbon fiber is still remained as the residue. Accordingly, the carbon fiber polymer composite waste material is usually seemed as the non-combustible solid waste and processed by the landfill manner. However, the landfill manner causes the waste of the land resource and further deteriorates surroundings. Moreover, the carbon fiber polymer composite has the high valuable carbon fiber therein, and processing by the landfill manner undoubtedly causes large waste of the carbon fiber.

There are several methods provided by the prior art to solve the above the problems, and they mainly decompose the polymers of the carbon fiber polymer composite, such that the carbon fiber in the carbon fiber polymer composite can be separated to achieve the objective of recycling the carbon fiber, wherein the polymer decomposing methods comprise the thermal decomposition, the inorganic strong acid decomposition, the organic solvent decomposition and the supercritical fluid decomposition. Though using the organic solvent decomposition can obtain the clean carbon fiber, much organic solvent is used during recycling, and thus it causes the pollution of the environment. Furthermore, after the solvent has been used, the separation operation of the solvent is complicate, and it causes the high recycling cost. Though the supercritical fluid decomposition has the clean and free pollution advantage, the supercritical fluid decomposition must progress under the high temperature and high pressure reaction condition, it needs high reaction device requirement, and the degraded production and the fluid are mixed together to be separated hardly.

The practicable industrial manner among the prior art is the thermal decomposition for processing the waste carbon fiber polymer composite. The thermal decomposition is to dispose the waste carbon fiber polymer composite in the thermal air for decomposition, and the manner is more effective for the carbon fiber polymer composite doped with the heterogeneous material, such as the metal, and can be operated continuously. However, the carbon fiber obtained from the reaction may be oxidized much, and it may have the little force property since the carbon fiber is strongly struck in the reactor or the separator. Accordingly, how to effectively use the novel method to recycle the high pure and high performance carbon fiber disposed at different angles and to reduce the input energy, consuming time and labor cost is still an issue to be continuously improved or solved by the carbon fiber recycling industry and researcher.

SUMMARY

A main objective of the present disclosure is to provide a carbon fiber recycling method which radiate the microwave to the carbon fiber of the carbon fiber polymer composite, such that energy of the microwave is quickly absorbed by the carbon fiber to quickly increase a temperature of the carbon fiber, and the carbon fiber polymer composite is effectively and quickly decomposed to remove most polymer matrix of the carbon fiber polymer composite, so as to achieve the objective of recycling the carbon fiber indeed.

To achieve one of the above objectives, the present disclosure provides a carbon fiber recycling method, adapted to recycle a first carbon fiber from a carbon fiber polymer composite which comprises a polymer matrix and the first carbon fiber, wherein the polymer matrix is coupled to the first carbon fiber, the first carbon fiber comprises a first long axis direction, and the carbon fiber recycling method utilizes a carbon fiber recycling device, and the carbon fiber recycling device comprises: at least one first microwave supplying unit and a cavity, the interior of the cavity is opened to have an accommodating space, and the cavity has a second long axis direction; wherein the carbon fiber recycling method comprises: disposing the carbon fiber polymer composite in the accommodating space; making the first microwave supplying unit to generate a first microwave, the first microwave has a first microwave direction, the first microwave is propagated to interior of the cavity; the first microwave comprises a first electric field, and the first electric field in the interior of the cavity has a first electric field direction; adjusting the first microwave supplying unit to change an angle between the first electric field direction and the second long axis direction, and making the first long axis direction of the first carbon fiber be parallel to the first electric field direction.

Regarding the above carbon fiber recycling method, the fiber recycling method firstly measures or detects a tilting angle between the first long axis direction of the first carbon fiber and the second long axis direction of the cavity, and then adjusts the first microwave of the first microwave supplying unit to make the angle between the first electric field direction and the second long axis direction equal to the tilting angle, such that the first electric field direction is parallel to the first long axis direction of the first carbon fiber.

Regarding the above carbon fiber recycling method, the cavity has a hollow tube installed in the accommodating space, an interior hollow portion of the hollow tube is opened to have a tube accommodating space, and the carbon fiber polymer composite is disposed in the tube accommodating space.

Regarding the above carbon fiber recycling method, the hollow tube is made of a microwave-penetrable material.

Regarding the above carbon fiber recycling method, the hollow tube is a quartz tube, a crystal tube or a glass tube.

Regarding the above carbon fiber recycling method, the cavity is a metal cavity.

Regarding the above carbon fiber recycling method, the first microwave supplying unit comprises a first microwave source and a first waveguide tube, wherein one end of the first waveguide tube is coupled to the first microwave source, and other one end of the first waveguide tube is coupled to the cavity.

Regarding the above carbon fiber recycling method, the carbon fiber recycling device comprises a condensation device, and the cavity is communicated with the condensation device.

Regarding the above carbon fiber recycling method, the cavity is a hollow polygonal prism.

Regarding the above carbon fiber recycling method, outer circumference of the hollow polygonal prism is formed by a plurality of outer surfaces, each of the outer surfaces has one of the first microwave supplying units, and the first microwave supplying unit of one of the two adjacent outer surfaces and the first microwave supplying unit of other one of the two adjacent outer surfaces are located at different levels.

Regarding the above carbon fiber recycling method, outer circumference of the hollow polygonal prism is formed by a plurality of outer surfaces, twos of the outer surfaces are respectively a first outer surface and a second outer surface, and the first outer surface and the second outer surface are adjacent to each other; inner circumference of the hollow polygonal prism is formed by a plurality of inner surfaces, and the inner surfaces have a first inner surface corresponding to the first outer surface and a second inner surface corresponding to the second outer surface; the first outer surface and the second outer surface have an angle therebetween, or the first inner surface and the second inner surface have the angle therebetween; the angle is between 60 degrees and 160 degrees.

Regarding the above carbon fiber recycling method, the angle is between 90 degrees and 150 degrees.

Regarding the above carbon fiber recycling method, the angle is between 120 degrees and 144 degrees.

Regarding the above carbon fiber recycling method, the angle is 120 degrees.

Regarding the above carbon fiber recycling method, the carbon fiber polymer composite further comprises a second carbon fiber, the second carbon fiber comprises a third long axis direction; the carbon fiber recycling device further comprises a second microwave supplying unit for generating a second microwave, and the second microwave propagated to interior of the cavity; the second microwave comprises a second electric field, and the second electric field has a second electric field direction; and the carbon fiber recycling method further comprises: adjusting the second microwave supplying unit to change an angle between the second electric field direction and the second long axis direction, and making third long axis direction of the second carbon fiber is parallel to the second electric field direction.

Regarding the above carbon fiber recycling method, the second electric field direction is perpendicular to the first electric field direction.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

To understand the technical features, content and advantages of the present disclosure and its efficacy, the present disclosure will be described in detail with reference to the accompanying drawings. The drawings are for illustrative and auxiliary purposes only and may not necessarily be the true scale and precise configuration of the present disclosure. Therefore, the scope of the present disclosure should not be limited to the scale and configuration of the attached drawings.

Firstly, referring to FIG. 1 through FIG. 4, the carbon fiber recycling method of a first embodiment of the present disclosure is used to recycle a first carbon fiber 21 from a carbon fiber polymer composite 2. The carbon fiber polymer composite 2 comprises a polymer matrix 24 and the first carbon fiber 21, wherein the polymer matrix 24 is coupled to the first carbon fiber 21, and the first carbon fiber 21 comprises a long axis direction X (a first long axis direction), the long axis direction X of the first carbon fiber 21 is the extending direction of the first carbon fiber 21. Preferably, the polymer matrix 24 covers the first carbon fiber 21 and couples to the first carbon fiber 21. Preferably, the carbon fiber polymer composite 2 comprises the polymer matrix 24 and a plurality of the first carbon fibers 21, and the first carbon fibers 21 are arranged parallel to the long axis direction X of the first carbon fibers 21. The polymer matrix 24 can be the thermosetting resin, the room temperature curing resin or the thermoplastic, and the thermosetting resin can be one of the unsaturated polyester resin and the epoxy resin for example.

Figure 1:
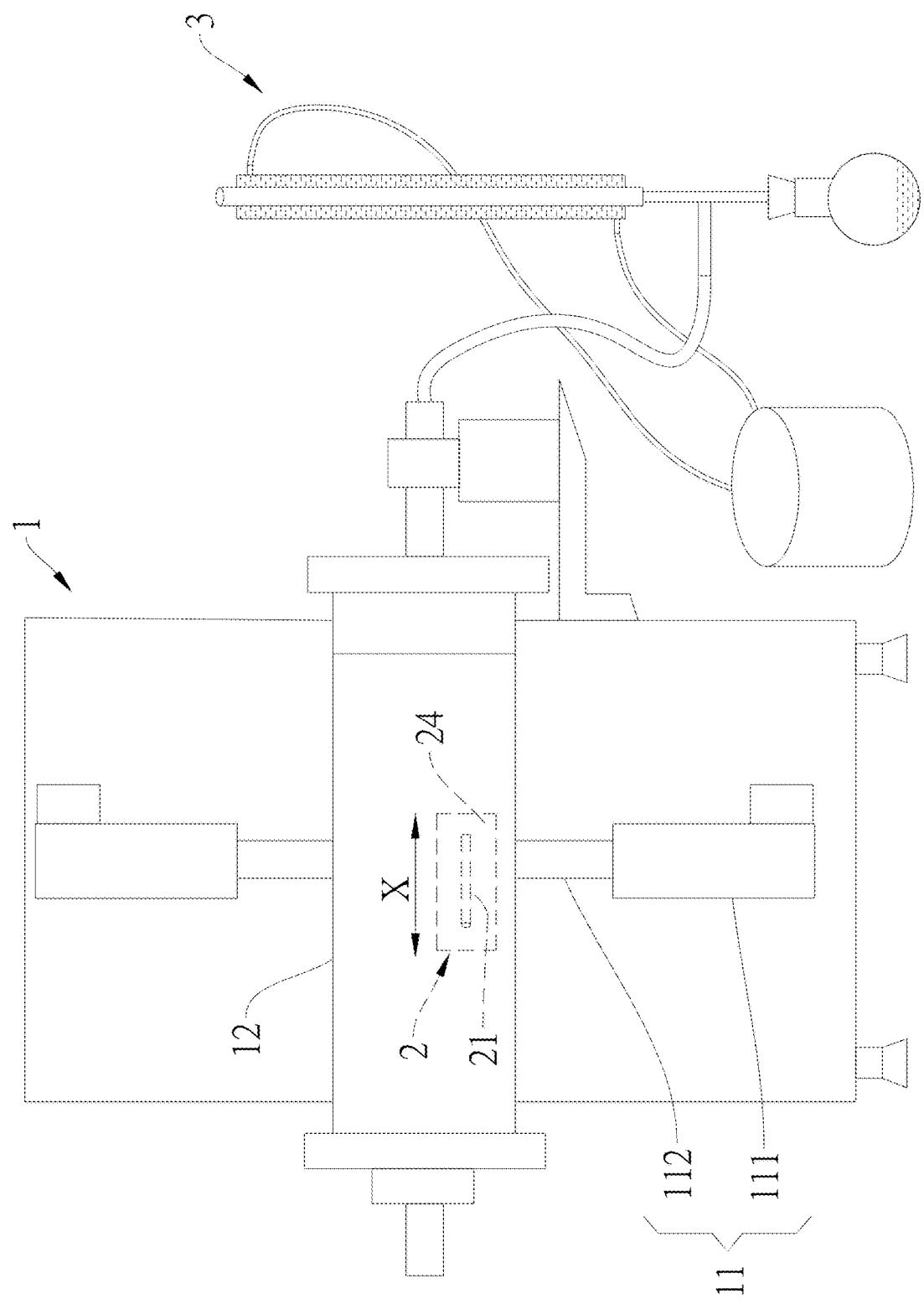
FIG. 1 is a schematic diagram of a whole carbon fiber recycling device utilized by the carbon fiber recycling method according to a first embodiment of the present disclosure.
Figure 2:
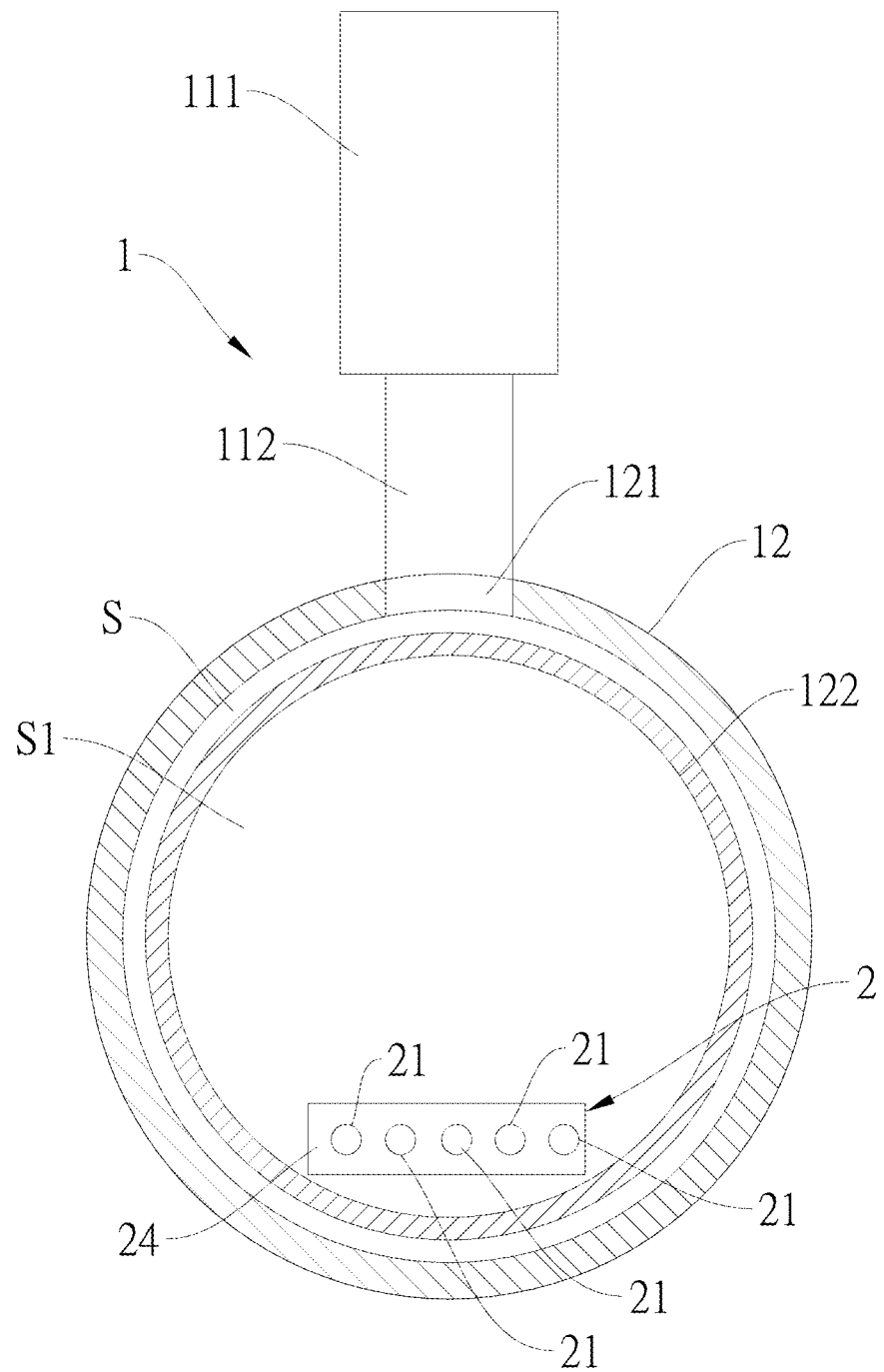
FIG. 2 is a sectional view of a microwave supplying unit and a cavity of the carbon fiber recycling device utilized by the carbon fiber recycling method according to the first embodiment of the present disclosure.
Figure 3:
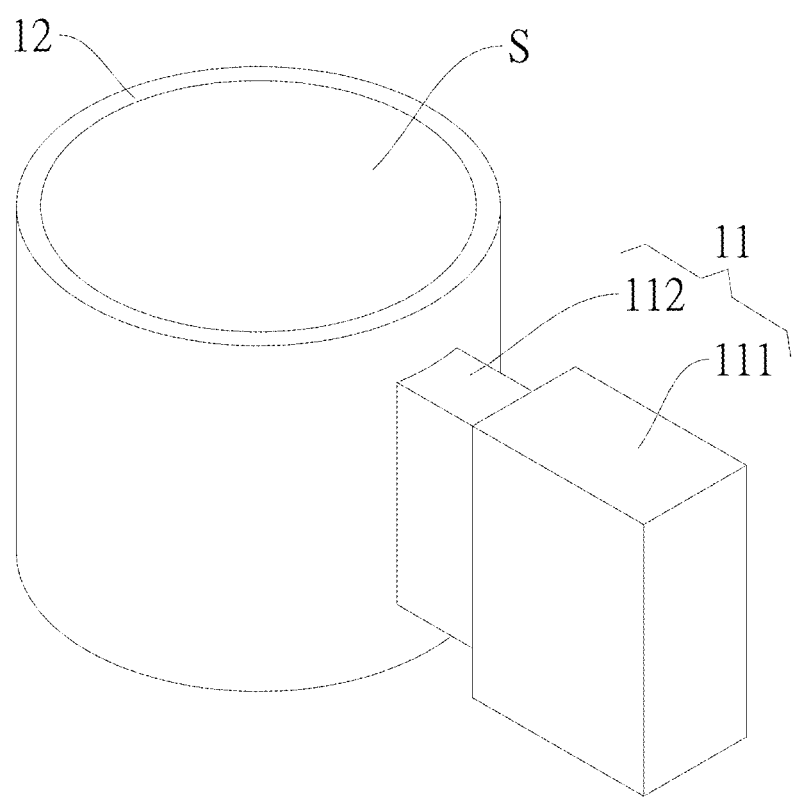
FIG. 3 is a three dimensional view of the microwave supplying unit and the cavity of the carbon fiber recycling device utilized by the carbon fiber recycling method according to the first embodiment of the present disclosure.
Figure 4:
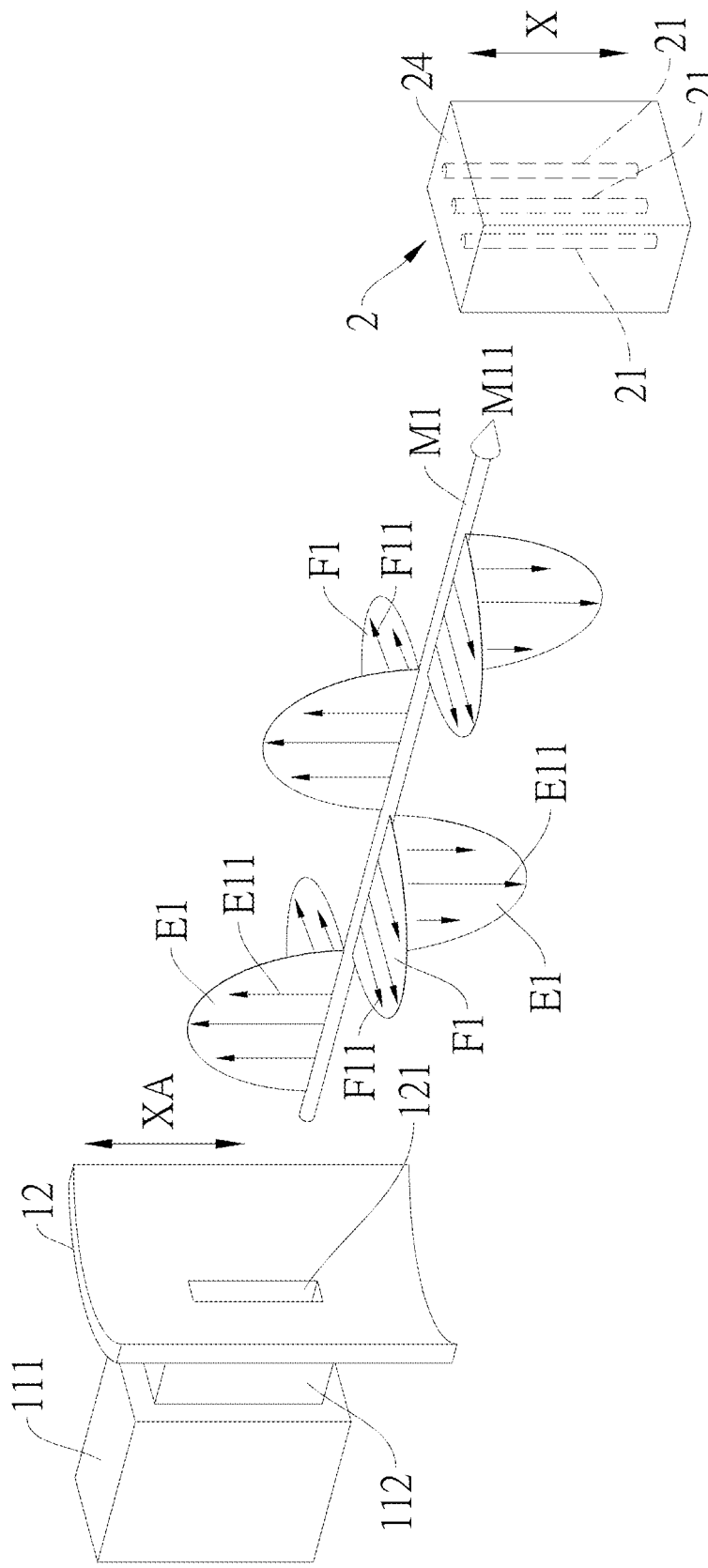
FIG. 4 is a schematic diagram showing a propagating direction of the microwave of the carbon fiber recycling device utilized by the carbon fiber recycling method according to the first embodiment of the present disclosure.

The carbon fiber recycling method utilizes the carbon fiber recycling device 1 of the present disclosure, and the carbon fiber recycling device 1 comprises at least one first microwave supplying unit 11 and a cavity 12, wherein the first microwave supplying unit 11 comprises a first microwave source 111 and a first waveguide tube 112. One end of the first waveguide tube 112 is coupled to the first microwave source 111, and other one end of the first waveguide tube 112 is coupled to the cavity 12. The first microwave supplying unit 11 is used to generate a first microwave M1, and the first microwave M1 is propagated into interior of the cavity 12 through the first waveguide tube 112 from the first microwave source 111. The first microwave M1 comprises a first electric field E1 and a first magnetic field F1, wherein the first microwave M1 is propagated into the interior of the cavity 12 along a first microwave direction M11, the first electric field E1 within the interior of the cavity 12 has a first electric field direction E11, and the first magnetic field F1 within the interior of the cavity 12 has a first magnetic field direction F11. According to Fleming's right-hand rule, as shown in FIG. 4, the first microwave direction M11, the first electric field direction E11 and the first magnetic field direction F11 are perpendicular to each other.

The interior of the cavity 12 is opened to have an accommodating space S, and the carbon fiber polymer composite 2 is disposed in the accommodating space S. The cavity 12 has a first sidewall hole 121 coupled to the other one end of the first waveguide tube 112, such that the first microwave M1 can be propagated to the accommodating space S. The cavity 12 is made of the microwave-reflective material, such as the cavity 12 is made of the metal material to form a metal cavity with a close configuration. Since the metal can reflects the first microwave M1, the first microwave M1 in the accommodating space S can oscillate and be uniformly filled in the cavity 12. Furthermore, by using the metal to reflect the first microwave M1, the operator and other device out of the cavity 12 can be protected. The shape of the cavity 12 is not limited, for example, the cavity 12 can be one of the hollow cylinder and the hollow polygonal prism. The cavity 12 has a long axis direction XA (a second long axis direction), wherein the long axis direction XA of the cavity 12 is the extending direction of the cavity 12. As shown in FIG. 4, the long axis direction XA of the cavity 12 is the extending direction of the hollow cylinder.

When practicing the carbon fiber recycling method, the carbon fiber polymer composite 2 is disposed in the accommodating space S. Next, the first microwave source 111 is activated to generate the first microwave M1, and the first microwave M1 is propagated to the accommodating space S through the first waveguide tube 112 and the first sidewall hole 121. The first microwave M1 is radiated to the carbon fiber polymer composite 2, such the first carbon fiber 21 within the carbon fiber polymer composite 2 can quickly absorb the energy of the first microwave M1, so as to increase the temperature of the first carbon fiber 21 immediately and to heat the first carbon fiber 21. Thus, the portion of the polymer matrix 24 contacting the carbon fiber is heated to be decomposed to a plurality of small organic molecules, and due to the heat transmission effect, the other portion of the polymer matrix 24 is also heated to be decomposed to a plurality of small organic molecules.

It is noted that, if the carbon fiber polymer composite 2 is disposed in the manner that the long axis direction X of first carbon fiber 21 is parallel to the first microwave direction M11, the absorption rate of the first carbon fiber 21 for the energy of the first microwave M1 will not be large, and the temperature of the first carbon fiber 21 will not be increased sufficiently, such that the polymer matrix 24 is unable to be decomposed to the small organic molecules. If the carbon fiber polymer composite 2 is disposed in the manner that the long axis direction X of first carbon fiber 21 is perpendicular to the first microwave direction M11, the absorption rate of the first carbon fiber 21 for the energy of the first microwave M1 will be large, and the temperature of the first carbon fiber 21 will be increased sufficiently, such that the polymer matrix 24 is able to be decomposed to the small organic molecules.

It is further to be noted that, in addition to make the long axis direction X of the first carbon fiber 21 be perpendicular to the first microwave direction M11, if the first carbon fiber 21 is disposed to further make the long axis direction X of the first carbon fiber 21 be perpendicular to the first electric field direction E11, the absorption rate of the first carbon fiber 21 for the energy of the first electric field E1 will not be large, and the temperature of the first carbon fiber 21 will not be increased sufficiently, such that the polymer matrix 24 is unable to be decomposed to the small organic molecules. If the first carbon fiber 21 is disposed to further make the long axis direction X of the first carbon fiber 21 be parallel to the first electric field direction E11, the absorption rate of the first carbon fiber 21 for the energy of the first electric field E1 will be large, and the temperature of the first carbon fiber 21 will be increased sufficiently, such that the polymer matrix 24 is able to be decomposed to the small organic molecules.

In the above descriptions, the preferred configuration is that the long axis direction XA of the cavity 12, the first electric field direction E11 and the long axis direction X of the first carbon fiber 21 are parallel to each other, the long axis direction XA of cavity 12 is perpendicular to the first microwave direction M11, and the long axis direction X of the first carbon fiber 21 is perpendicular to the first microwave direction M11.

The small organic molecules can be exhausted to be sent to a condensation device 3 from the accommodating space S of the cavity 12. The small organic molecules can be captured and condensed by the condensation device 3, so as to prevent the pollution of exhausting the small organic molecules to the air.

In the embodiment without additionally heating the cavity 12, the small organic molecules can be easily condensed at the sidewall of the cavity 12, and thus it causes the sidewall is polluted and not easily cleaned. In addition, the cavity 12 can be further has a hollow tube 122 installed within the accommodating space S, hollow portion of interior of the hollow tube 122 can be opened to have a tube accommodating space S1, and the carbon fiber polymer composite 2 is disposed in the tube accommodating space S1, wherein the hollow tube 122 can be made of a microwave-penetrable material, for example, the hollow tube 122 can be a quartz tube, a crystal tube or a glass tube. Therefore, the small organic molecules can be condensed at the tube wall of the hollow tube 122, such as the quartz tube, and cleaning the tube wall of the quartz tube is easier and faster than cleaning the sidewall of the cavity 12. Furthermore, the hollow tube 122 after one operation can be replaced by another one clean hollow tube 122, so as to increase the processing speed.

The first embodiment is particularly suitable for the carbon fiber polymer composite 2 which is formed by the longitude-arranged first carbon fibers 21 and the polymer matrix 24, for example, the ribbon shaped carbon fiber polymer composite 2 formed by the longitude-arranged first carbon fibers 21 and the polymer matrix 24, wherein a direction of the longitude related to "longitude-arranged" is the long axis direction X of the first carbon fiber 21.

Figure 5:
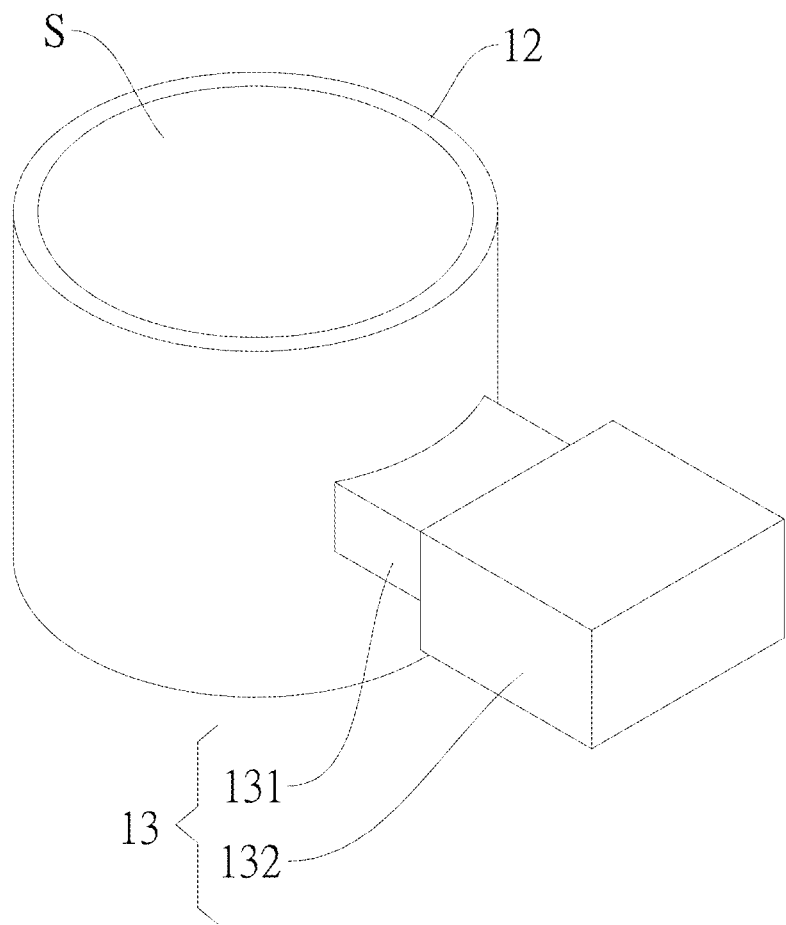
FIG. 5 is a three dimensional view of the microwave supplying unit and the cavity of the carbon fiber recycling device utilized by the carbon fiber recycling method according to a second embodiment of the present disclosure.
Figure 6:
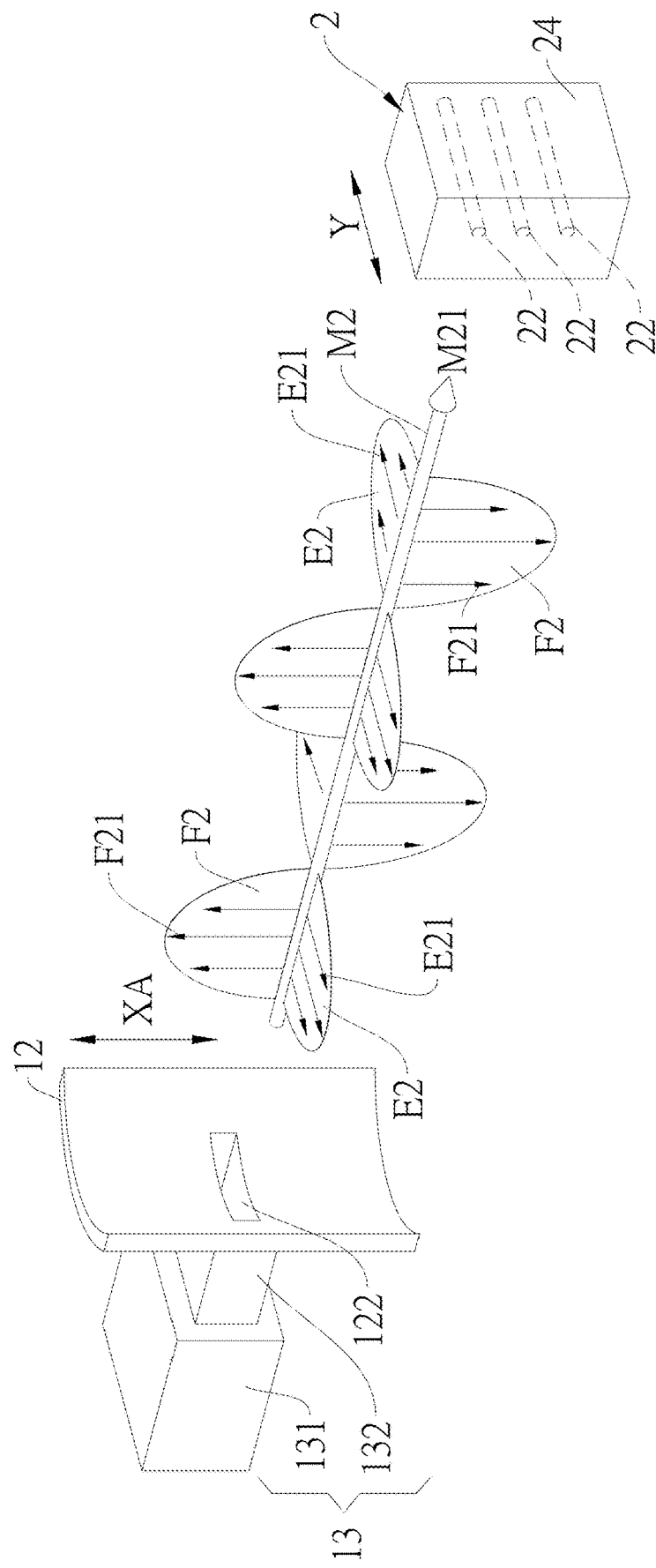
FIG. 6 is a schematic diagram showing a propagating direction of the microwave of the carbon fiber recycling device utilized by the carbon fiber recycling method according to the second embodiment of the present disclosure.

Referring to FIG. 5 and FIG. 6, a second embodiment of the present disclosure is illustrated. The carbon fiber recycling device 1 on the basis of the first embodiment further comprises at least one second microwave supplying unit 13, the second microwave supplying unit 13 is formed by a combination of a second microwave source 131 and a second waveguide tube 132. Similar to the first microwave supplying unit 11, one end of the second waveguide tube 132 is coupled to the second microwave source 131, and other one end of the second waveguide tube 132 is coupled to a second sidewall hole 122 of the cavity 12. The second microwave source 131 is used to generate a second microwave M2, the second microwave M2 is propagated to the second sidewall hole 122 and the accommodating space S of the cavity 12 from the second microwave source 131 through the second waveguide tube 132. The second microwave M2 comprises a second electric field E2 and a second magnetic field F2. The second microwave M2 is propagated to the interior (the accommodating space S) of the cavity along a second microwave direction M21. The second electric field E2 within the accommodating space S of the cavity has a second electric field direction E21. The second magnetic field F2 within the accommodating space S of the cavity has a second magnetic field direction F21. As shown in FIG. 6, the second microwave direction M21, the second electric field direction E21 and the second magnetic field direction F21 are perpendicular to each other.

On the basis of the first embodiment, in the second embodiment, the carbon fiber polymer composite 2 further comprises a second carbon fiber 22, and the second carbon fiber 22 further comprises a long axis direction Y (a third long axis direction), wherein the long axis direction Y of the second carbon fiber 22 is the extending direction of the second carbon fiber 22. Preferably, the polymer matrix 24 covers the second carbon fiber 22 and couples the second carbon fiber 22. Preferably, the carbon fiber polymer composite 2 comprises the polymer matrix 24 and a plurality of second carbon fibers 22, and the second carbon fibers 22 are arranged parallel to each other and along the long axis direction Y of the second carbon fiber 22.

The descriptions similar to the first embodiment will not be described again in the second embodiment. The long axis direction Y of the second carbon fiber 22 is perpendicular to the second microwave direction M21, and the long axis direction Y of the second carbon fiber 22 is parallel to the second electric field direction E21.

The long axis direction XA of the cavity 12 is perpendicular to the second electric field direction E21, the long axis direction XA of the cavity 12 is perpendicular to the long axis direction Y of the second carbon fiber 22, and the long axis direction XA of the cavity 12 is perpendicular to the second microwave direction M21.

The second electric field direction E21 is perpendicular to the first electric field direction E11.

The second embodiment is suitable for the carbon fiber polymer composite 2 which is formed by the latitude-arranged second carbon fibers 22 and the polymer matrix 24, for example, the ribbon shaped carbon fiber polymer composite 2 formed by the latitude-arranged second carbon fibers 22 and the polymer matrix 24, wherein a direction of the latitude related to "latitude-arranged" is the long axis direction Y of the second carbon fiber 22.

Figure 7:
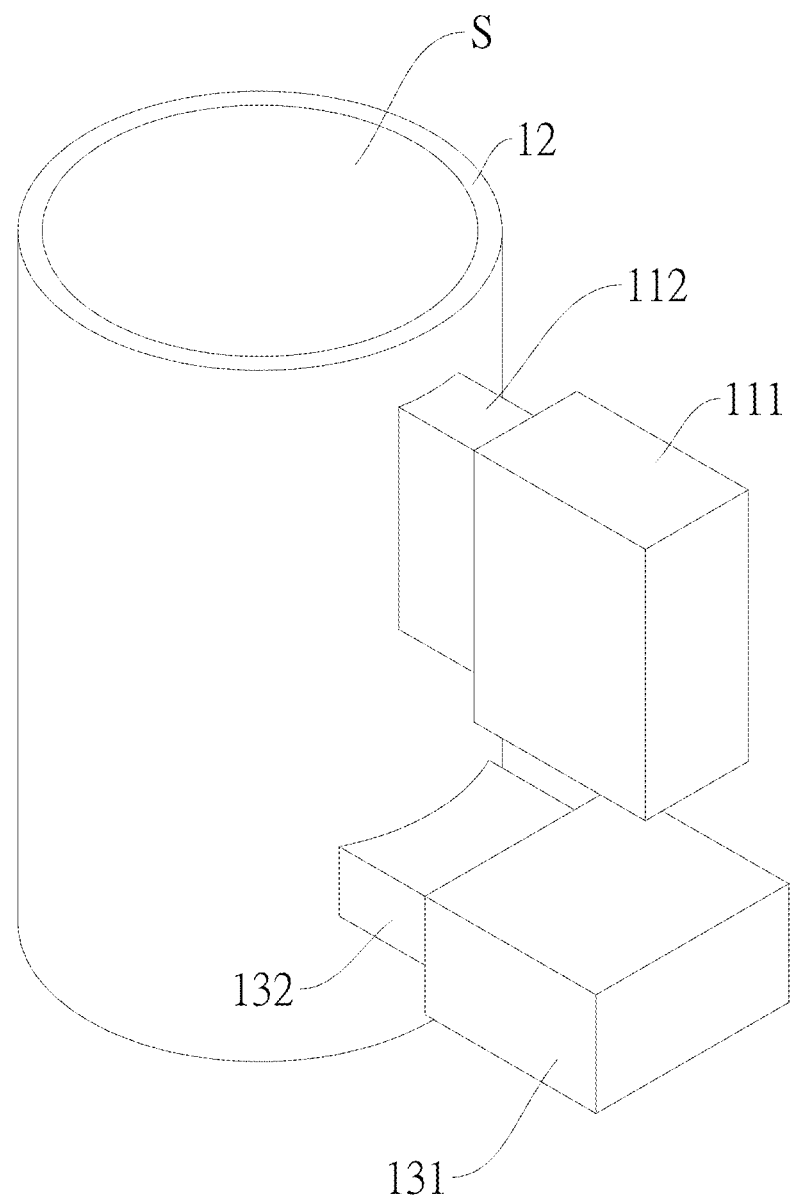
FIG. 7 is a three dimensional view of the microwave supplying unit and the cavity of the carbon fiber recycling device utilized by the carbon fiber recycling method according to a third embodiment of the present disclosure.
Figure 8:
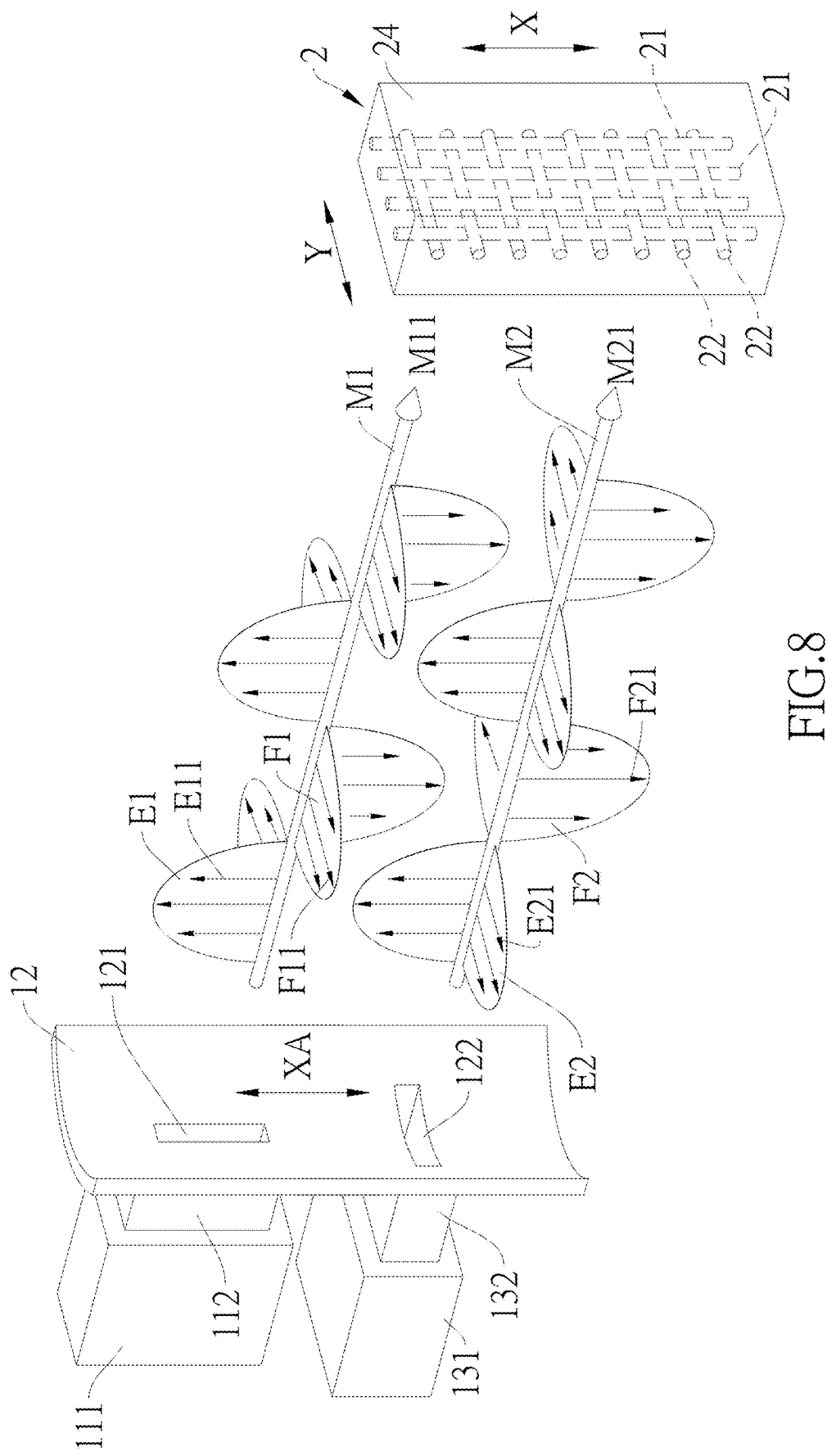
FIG. 8 is a schematic diagram showing a propagating direction of the microwave of the carbon fiber recycling device utilized by the carbon fiber recycling method according to the third embodiment of the present disclosure.

Referring to FIG. 7 and FIG. 8, a third embodiment of the present disclosure is illustrated. The descriptions similar to the first and second embodiments will not be illustrated in the third embodiment. The carbon fiber recycling device 1 simultaneously comprises the first microwave supplying unit 11 and the second microwave supplying unit 13. Preferably, the first microwave supplying unit 11 and the second microwave supplying unit 13 are arranged along the long axis direction XA of the cavity 12 in sequence. The third embodiment is suitable for the carbon fiber polymer composite 2 which is formed by the simultaneously longitude-arranged and latitude-arranged first and second carbon fibers 21, 22 and the polymer matrix 24, for example, the ribbon shaped carbon fiber polymer composite 2 formed by the simultaneously longitude-arranged and latitude-arranged first and second carbon fibers 21, 22 and the polymer matrix 24.

Figure 9:
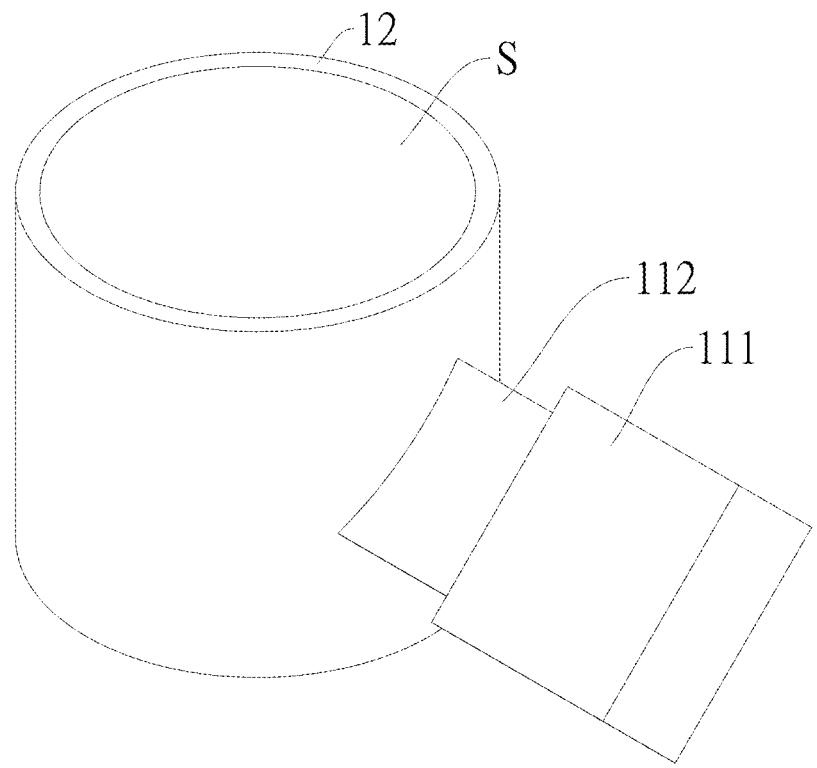
FIG. 9 is a three dimensional view of the microwave supplying unit and the cavity of the carbon fiber recycling device utilized by the carbon fiber recycling method according to a fourth embodiment of the present disclosure.
Figure 10:
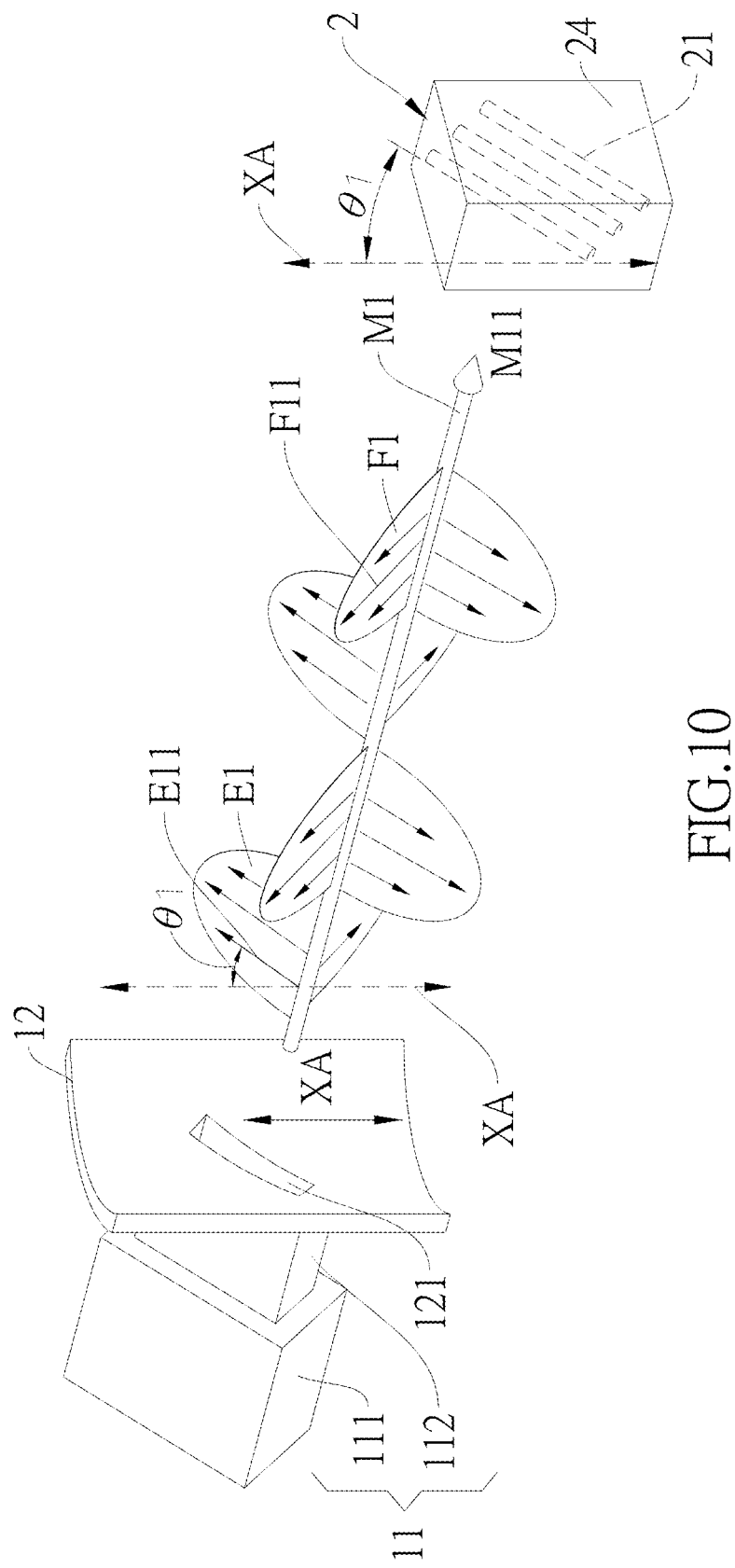
FIG. 10 is a schematic diagram showing a propagating direction of the microwave of the carbon fiber recycling device utilized by the carbon fiber recycling method according to the fourth embodiment of the present disclosure.

Referring to FIG. 9 and FIG. 10, a fourth embodiment of the present disclosure is described. The fourth embodiment adjusts the first microwave supplying unit 11 in the first embodiment, to make the first electric field direction E11 and the long axis direction XA of the cavity 12 have a tilting angle $\theta 1$ therebetween, the tilting angle $\theta 1$ is larger than 0 degree and less or equal to 90 degrees. The fourth embodiment is suitable for the case that the long axis direction X of the first carbon fiber 21 and the long axis direction XA of the cavity 12 have the tilting angle $\theta 1$ therebetween when the carbon fiber polymer composite 2 is disposed in the interior of the cavity 12. In other words, the first microwave supplying unit 11 can adjust the first microwave M1 to make the angle between the first electric field direction E11 and the long axis direction XA of the cavity 12 change according to the actual requirement. For example, when the carbon fiber polymer composite 2 is disposed in the interior of the cavity 12, the tilting angle $\theta 1$ between the long axis direction X of the first carbon fiber 21 and the long axis direction XA of the cavity 12 can be firstly measured or detected, and next, the first microwave M1 of the first microwave supplying unit 11 can be adjusted, so as to make angle between the first electric field direction E11 and the long axis direction XA of the cavity 12 be the same as the tilting angle $\theta 1$. Accordingly, the first electric field direction E11 and the long axis direction X of the first carbon fiber 21 are parallel to each other. When the carbon fiber polymer composite 2 is disposed in the interior of the cavity 12, it does not need to align long axis direction X of the first carbon fiber 21 to the long axis direction XA of the cavity 12 previously, but as mentioned above, it needs to adjust the first microwave supplying unit 11 according to the requirement to make the first electric field direction E11 and the long axis direction X of the first carbon fiber 21 be parallel to each other, and thus the convenience of disposing the carbon fiber polymer composite 2 in the interior of the cavity 12 can be increased. In other words, when practicing the carbon fiber recycling method, the first microwave supplying unit 11 is adjusted to change the angle between the first electric field direction E11 and the long axis direction XA of the cavity 12 and to make the long axis direction X of first carbon fiber 21 be parallel to the first electric field direction E11. Similarly, the second microwave supplying unit 13 can adjust the second microwave M2 to make the angle between the second electric field direction E21 and the long axis direction XA of the cavity 12 change according to the actual requirement. Since the operation mechanism and principle are the same as the above descriptions in the fourth embodiment, thus omitting the redundant descriptions. For example, the carbon fiber recycling method further comprises a step of adjusting the second microwave supplying unit 1 for changing the angle between the second electric field direction E21 and the long axis direction XA of the cavity 12 and to make the long axis direction Y of the second carbon fiber 22 be parallel to the second electric field direction E21.

Figure 11:
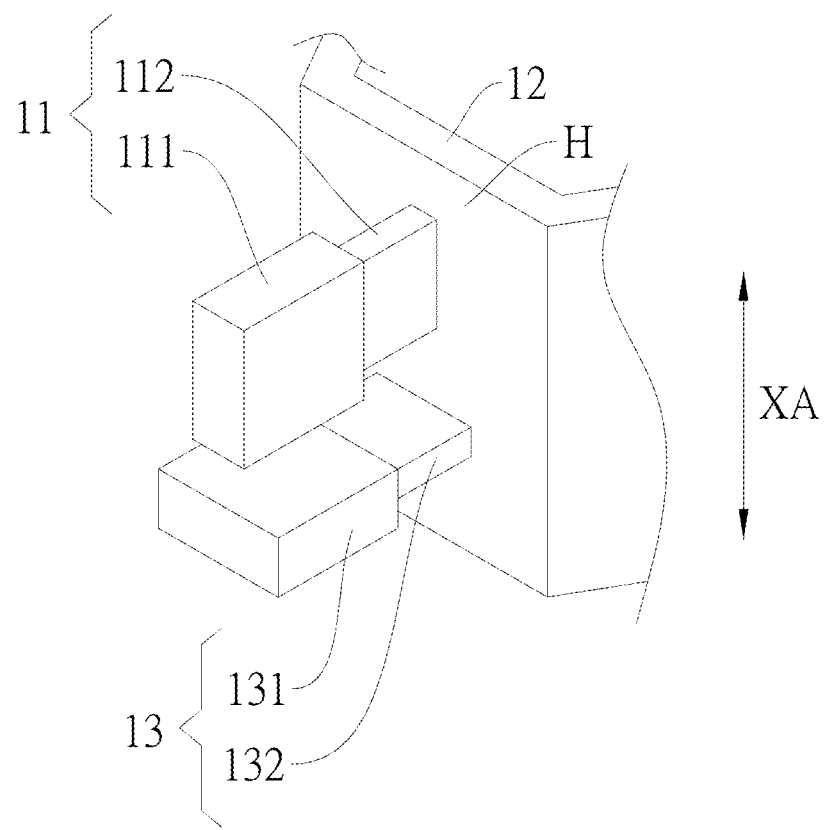
FIG. 11 is a three dimensional view of the microwave supplying unit and the cavity of the carbon fiber recycling device according to a fifth embodiment of the present disclosure.

Referring to FIG. 11, a fifth embodiment of the present disclosure is illustrated. The difference between the fifth embodiment and the third embodiment is that the cavity 12 is a hollow polygonal prism, wherein outer circumference of the hollow polygonal prism is formed by a plurality of outer surfaces H, and the first microwave supplying unit 11 and the second microwave supplying unit 13 are arranged on one of the outer surfaces H of the hollow polygonal prism along the long axis direction XA of the cavity 12 in sequence. The hollow polygonal prism may be a hollow triangular prism, a hollow quadrangular prism, a hollow pentagonal prism, a hollow hexagonal prism, a hollow heptagonal prism, a hollow octagonal prism, a hollow nonagonal prism, a hollow decagonal prism, a hollow hendecagonal prism, a hollow dodecagonal prism, a tridecagonal prism, a hollow tetradecagonal prism, a hollow pentadecagonal prism, a hollow hexadecagonal prism, a hollow heptadecagonal prism, a hollow octadecagonal prism and other hollow polygonal prism.

Figure 12:
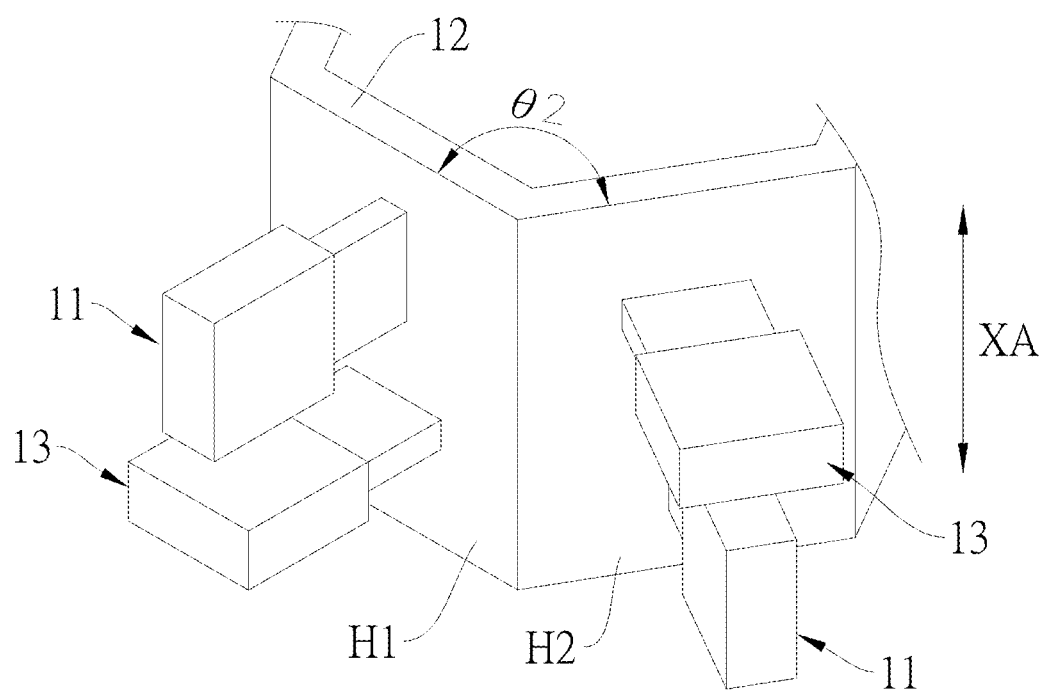
FIG. 12 is a three dimensional view of the microwave supplying unit and the cavity of the carbon fiber recycling device utilized by the carbon fiber recycling method according to a sixth embodiment of the present disclosure.

Referring to FIG. 12, a sixth embodiment of the present disclosure is illustrated. The difference between the sixth embodiment and the fifth embodiment is that twos of the outer surfaces H are respectively a first outer surface H1 and a second outer surface H2, wherein each of the first outer surface H1 and the second outer surface H2 has one of the first microwave supplying units 11 and one of the second microwave supplying units 13, and the first microwave supplying unit 11 and the second microwave supplying unit 13 are arranged along the long axis direction XA of the cavity 12 in sequence. The first microwave supplying unit 11 of the first outer surface H1 and the first microwave supplying unit 11 of the second outer surface H2 are located at different levels, and the second microwave supplying unit 13 of the first outer surface H1 and the second microwave supplying unit 13 of the second outer surface H2 are located at different levels. The first microwave supplying unit 11 of the outer surface H1 and the second microwave supplying unit 13 of the second outer surface H2 are located at a same level, and second microwave supplying unit 13 of the outer surface H1 and the first microwave supplying unit 11 of the second outer surface H2 are located at a same level. Preferably, the first outer surface H1 is adjacent to the second outer surface H2.

The first outer surface H1 and the second outer surface H2 have an angle θ2 therebetween; or alternatively, inner circumference of the hollow polygonal prism is formed by a plurality of inner surfaces, the inner surfaces have a first inner surface (not shown in the drawings) corresponding to the first outer surface H1, the inner surfaces have a second inner surface (not shown in the drawings) corresponding to the second outer surface H2, and the first and second inner surface have the angle θ2 therebetween. The angle θ2 is between 60 degrees and 160 degrees. Preferably, the angle θ2 is between 90 degrees and 150 degrees. More preferably, the angle θ2 is between 120 degrees and 144 degrees. Optimally, the angle θ2 is 120 degrees. It is noted that, the range in the present disclosure comprises the end value.

Certainly, the present disclosure can dispose one of the first microwave supplying units 11 and one of the second microwave supplying units 13 on each of the outer surfaces H, wherein the first microwave supplying unit 11 on one of the two adjacent outer surfaces H and the first microwave supplying unit 11 on other one of the two adjacent outer surfaces H are located at different levels, and the first microwave supplying unit 11 on one of the two adjacent outer surfaces H and the second microwave supplying unit 13 on other one of the two adjacent outer surfaces H are located at a same level.

To sum up, the carbon fiber recycling device of the present disclosure is indeed disclosed by the descriptions of different embodiments, and the carbon fiber recycling device in one of the embodiments can achieve the desired result(s). Furthermore, the carbon fiber recycling device of the present disclosure is not anticipated and obtained by the prior art, and the present disclosure complies with the provision of the patent act. The present disclosure is applied according to the patent act, and the examination and allowance requests are solicited respectfully.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A carbon fiber recycling method, adapted to recycle a first carbon fiber from a carbon fiber polymer composite which comprises a polymer matrix and the first carbon fiber, wherein the polymer matrix is coupled to the first carbon fiber, the first carbon fiber comprises a first long axis direction, and the carbon fiber recycling method utilizes a carbon fiber recycling device, and the carbon fiber recycling device comprises: at least one first microwave supplying unit and a cavity, the interior of the cavity is opened to have an accommodating space, and the cavity has a second long axis direction; wherein the carbon fiber recycling method comprises:

disposing the carbon fiber polymer composite in the accommodating space;

making the first microwave supplying unit to generate a first microwave, the first microwave has a first microwave direction, the first microwave is propagated to interior of the cavity; the first microwave comprises a first electric field, and the first electric field in the interior of the cavity has a first electric field direction;

adjusting the first microwave supplying unit to change an angle between the first electric field direction and the second long axis direction, and making the first long axis direction of the first carbon fiber be parallel to the first electric field direction.

2. The carbon fiber recycling method according to claim 1, wherein the fiber recycling method firstly measures or detects a tilting angle between the first long axis direction of the first carbon fiber and the second long axis direction of the cavity, and then adjusts the first microwave of the first microwave supplying unit to make the angle between the first electric field direction and the second long axis direction equal to the tilting angle, such that the first electric field direction is parallel to the first long axis direction of the first carbon fiber.

3. The carbon fiber recycling method according to claim 2, wherein the cavity has a hollow tube installed in the accommodating space, an interior hollow portion of the hollow tube is opened to have a tube accommodating space, and the carbon fiber polymer composite is disposed in the tube accommodating space.

4. The carbon fiber recycling method according to claim 3, wherein the hollow tube is made of a microwave-penetrable material.

5. The carbon fiber recycling method according to claim 4, wherein the hollow tube is a quartz tube, a crystal tube or a glass tube.

6. The carbon fiber recycling method according to claim 5, wherein the cavity is a metal cavity.

7. The carbon fiber recycling method according to claim 6, wherein the first microwave supplying unit comprises a first microwave source and a first waveguide tube, wherein one end of the first waveguide tube is coupled to the first microwave source, and other one end of the first waveguide tube is coupled to the cavity.

8. The carbon fiber recycling method according to claim 7, wherein the carbon fiber recycling device comprises a condensation device, and the cavity is communicated with the condensation device.

9. The carbon fiber recycling method according to claim 8, wherein the cavity is a hollow cylinder.

10. The carbon fiber recycling method according to claim 8, wherein the cavity is a hollow polygonal prism.

11. The carbon fiber recycling method according to claim 10, wherein outer circumference of the hollow polygonal prism is formed by a plurality of outer surfaces, each of the outer surfaces has one of the first microwave supplying units, and the first microwave supplying unit of one of the two adjacent outer surfaces and the first microwave supplying unit of other one of the two adjacent outer surfaces are located at different levels.

12. The carbon fiber recycling method according to claim 11, wherein outer circumference of the hollow polygonal prism is formed by a plurality of outer surfaces, twos of the outer surfaces are respectively a first outer surface and a second outer surface, and the first outer surface and the second outer surface are adjacent to each other; inner circumference of the hollow polygonal prism is formed by a plurality of inner surfaces, and the inner surfaces have a first inner surface corresponding to the first outer surface and a second inner surface corresponding to the second outer surface; the first outer surface and the second outer surface have an angle therebetween, or the first inner surface and the second inner surface have the angle therebetween; the angle is between 60 degrees and 160 degrees.

13. The carbon fiber recycling method according to claim 12, wherein the angle is between 90 degrees and 150 degrees.

14. The carbon fiber recycling method according to claim 12, wherein the angle is between 120 degrees and 144 degrees.

15. The carbon fiber recycling method according to claim 12, wherein the angle is 120 degrees.

16. The carbon fiber recycling method according to claim 2, wherein the carbon fiber polymer composite further comprises a second carbon fiber, the second carbon fiber comprises a third long axis direction; the carbon fiber recycling device further comprises a second microwave supplying unit for generating a second microwave, and the second microwave propagated to interior of the cavity; the second microwave comprises a second electric field, and the second electric field has a second electric field direction; and the carbon fiber recycling method further comprises: adjusting the second microwave supplying unit to change an angle between the second electric field direction and the second long axis direction, and making third long axis direction of the second carbon fiber is parallel to the second electric field direction.

17. The carbon fiber recycling method according to claim 16, wherein the second electric field direction is perpendicular to the first electric field direction.

\* \* \* \* \*